United States Patent [19]

Canonne

[11] 3,969,513
[45] July 13, 1976

[54] METHOD FOR CANDYING CHEWING-GUM SLABS

[75] Inventor: Jacques Edmond Marie Canonne, Geneva, Switzerland

[73] Assignee: Soreat S.A., Geneva, Switzerland

[22] Filed: Dec. 3, 1974

[21] Appl. No.: 529,116

[30] Foreign Application Priority Data
Oct. 22, 1974  France .................. 74.35454

[52] U.S. Cl. ............... 426/5; 426/293; 426/302; 426/303; 426/517
[51] Int. Cl.² ............ A23G 3/00; A23G 3/30
[58] Field of Search ......... 426/302, 295, 291, 293, 426/3, 4, 5, 303, 304, 305, 307, 289, 274, 517

[56] References Cited
UNITED STATES PATENTS

| | | | |
|---|---|---|---|
| 312,041 | 2/1885 | Upjohn | 426/293 |
| 1,267,320 | 5/1918 | Fries | 426/5 |
| 2,304,246 | 12/1942 | Ekert | 426/5 |
| 2,460,698 | 2/1949 | Lindhe | 426/5 |
| 3,455,755 | 7/1969 | Phillips | 426/5 X |
| 3,488,200 | 1/1970 | Glasgow et al. | 426/302 |
| 3,502,480 | 3/1970 | Cancel et al. | 426/302 X |
| 3,524,756 | 8/1970 | Signorino et al. | 426/302 X |
| 3,635,735 | 1/1972 | Patil | 426/3 |
| 3,644,169 | 2/1972 | Phillips | 426/5 |

FOREIGN PATENTS OR APPLICATIONS

| | | | |
|---|---|---|---|
| 246,015 | 5/1963 | Australia | 426/5 |
| 1,904,140 | 1/1969 | Germany | 426/5 |

*Primary Examiner*—S. Leon Bashore
*Assistant Examiner*—Kenneth M. Schor
*Attorney, Agent, or Firm*—Browdy and Neimark

[57] ABSTRACT

The method comprises the steps of coating the two larger sides of chewing-gum slabs with a film of granulated sugar and submitting them to a spray of a hot fluid, passing then said slabs through a drying tunnel in which, besides being dried, the slabs are cooled in view of grouping them in a packing station to obtain packed units containing several independent slabs which cannot stick together.

4 Claims, 1 Drawing Figure

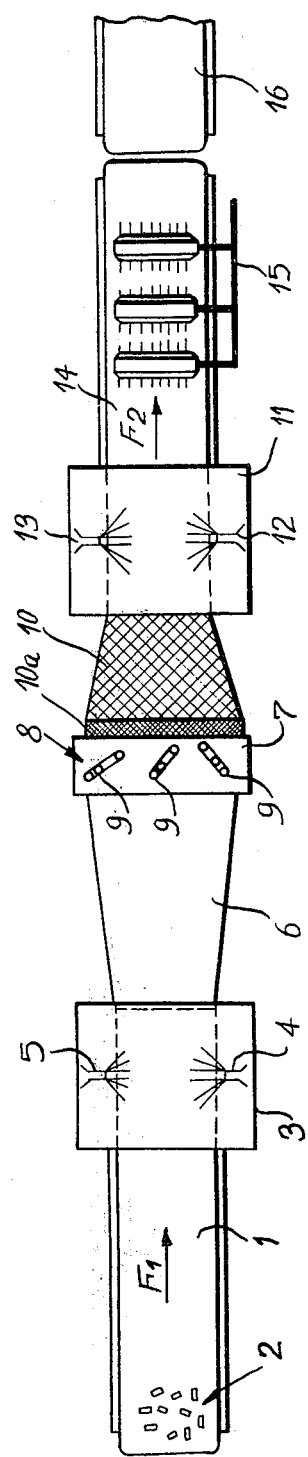

METHOD FOR CANDYING CHEWING-GUM SLABS

There presently exists two types of chewing pastes, called "chewing-gum", i.e. the chewing-gum proper so to speak and the chewing-gum with a base of double-bubble enabling one to make bubbles by breathing out a small quantity of air.

These two types of chewing-gum are sold in the form of slabs of various volumes and weights, or in the form of sugar-coated pills.

The sugar-coated pills are generally grouped in a common package, while providing no gluing to each other, and the sugar they are coated with can be aromatized.

However, the slabs require a separate package to avoid the risk of becoming a mass in a common package if they have a nice consistency of a chewing paste and not that of dried and thin slabs which recover a consistency of a chewing paste only when in contact with saliva, after some time of chewing said slabs in the mouth.

This invention copes with said disadvantages by creating a method for manufacturing chewing-gum having, at the end of manufacturing it, the nice consistency required but wherein several slabs can be grouped in the same package without any risk of becoming agglutinated as a mass. This method thus ensures an important saving of money regarding the packing cost of the slabs and provides an output much higher than that of the sugar-coated chewing-pill manufacturing methods.

According to this invention, the method comprises the steps of covering chewing-gum slabs on both sides thereof with a coating of granulated sugar having a suitable granulometry after having submitted them to a spray of a hot fluid product, then passing said slabs through a drying tunnel in which, besides being dried, the slabs are cooled in view of grouping them in a packing station to obtain packed units containing several independent slabs, which cannot stick together.

Various other features of the invention are moreover shown in the following detailed description.

An embodiment of this invention is shown by way of example in the accompanying drawing, in which The only figure is a plan view of a machine embodying the method of the invention.

In the drawing is shown a conveyor 1 moving in the direction of the arrow $F_1$ and carrying chewing-gum slabs 2 which, due to the fact of the motion of the conveyor 1, passes into a station 3 comprising nozzles 4 and 5 placed above the conveyor, for spraying a hot fluid. The conveyor still moving in the same direction (arrow $F_1$) arrives in front of a ramp 6.

The slabs of hot gum then fall into a container 7 forming a mixing station, and in which they are mixed in granulated sugar 8 by means of mixing components 9. Then they are taken by an elevator 10a onto an inclined area 10 made up of a thin screen, the excess sugar on the slabs being thus recovered and recycled. The slabs are then taken from the station 10 to be directed to a station 11. The station 11 comprises nozzles 12, 13 spraying a hot fluid so as to fix the granulated sugar on the surfaces of the chewing-gum slabs. This second spraying causes a slight melting on the surface of the sugar particles, which makes it easier for the sticking of the sugar onto the slabs of chewing-gum as well as the gluing of the particles of sugar. Lastly, due to the fact that in the station 11 the chewing-gum slabs are placed on a conveyor 14 moving in the direction of the arrow $F_2$, they pass under a drying station 15 and then onto a conveyor 16 taking them to a packing machine.

Since the slabs are coated with granulated sugar which is perfectly dry they do not have any chance of sticking to each other.

Though any kind of sugar can be used, it is also possible in this candying method to obtain an additional aromatization of the chewing-gum by using a suitably aromatized sugar.

This method has been found to be very suitable since when aromas are incorporated to the gum paste, they are slowly and not completely developed, while when candying is aromatized, the aromas are immediately and completely developed in the mouth.

It has been pointed out in the above disclosure that the chewing-gum slabs were mixed with sugar, said sugar being then fixed by a spray of hot fluid such as water steam, but in some cases it is possible to first coat the chewing-gum slabs with an eatable gluing liquid applied to the slabs in the form of a spray or of a hot aerosol, then to spray granulated sugar onto said chewing-gum slabs. Then the slabs so coated are dried and cooled.

As an eatable gluing liquid product, there can be used a solution of honey, molasses, syrup, gum-arabic, etc . . .

This invention is not restricted to the embodiments shown and described in detail, for various modifications thereof can moreover be applied thereto without departing from the scope of this invention as shown in the appended claims.

I claim:

1. A method for candying chewing-gum slabs comprising the steps of:
   spraying the chewing gum slabs with eatable hot fluid;
   coating the heated slabs with granulated confection sugar;
   drying and cooling the coated slabs at a single drying tunnel; and
   grouping the cooled coated slabs into packed units wherein individual slabs of gum are in direct contact with one another without sticking together.

2. The method as set forth in claim 1, wherein the hot fluid is selected from the group consisting of water steam and an eatable solution of honey, molasses, syrup or gum-arabic.

3. A method in accordance with claim 1 wherein said hot fluid is an eatable gluing solution of honey, molasses, syrup or gum-arabic and said coating step comprises mixing the slabs coated with gluing solution in granulated confection sugar.

4. A method in accordance with claim 1 further including, after said coating step and prior to said drying and cooling step, the step of:
   passing the coated slabs under a second spray of an eatable hot fluid.

* * * * *